Oct. 5, 1971  E. J. ROLLBAND  3,609,800
CULINARY UTENSIL
Filed April 27, 1970
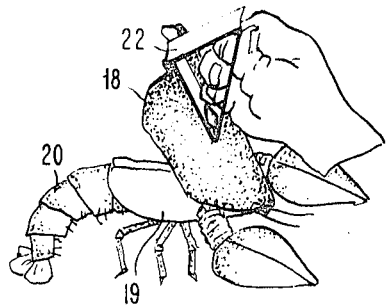
FIG. 4
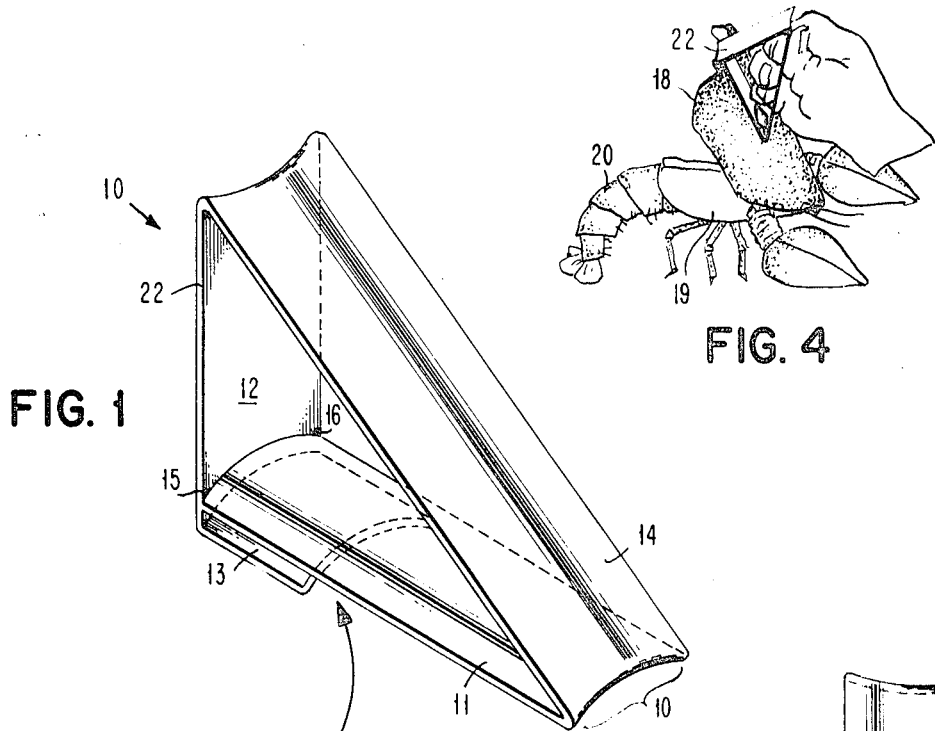
FIG. 1
FIG. 1a FIG. 3
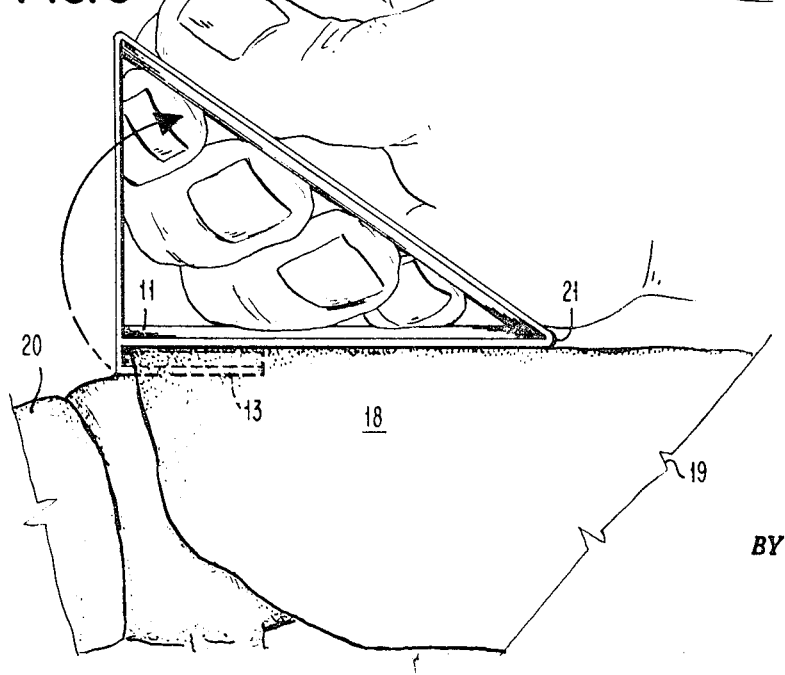
INVENTOR.
ERNEST J. ROLLBAND
BY *Frederick E. Bartho*

United States Patent Office 3,609,800
Patented Oct. 5, 1971

3,609,800
CULINARY UTENSIL
Ernest J. Rollband, Merrick, N.Y. (Green Acres Mobile Home Park, 3415 Slaterville Road, R.D. 1, Brooktondale, N.Y. 14817)
Filed Apr. 27, 1970, Ser. No. 31,922
Int. Cl. A22c 29/00
U.S. Cl. 17—73
6 Claims

ABSTRACT OF THE DISCLOSURE

A culinary utensil consisting of a deltoidal-shaped frame having a hooked portion for the safe and easy removal of the dorsal shell of crustaceans, such as lobsters, is described.

This invention relates to culinary utensils and, more particularly, to a hand implement useful in the preparation of crustaceans, particularly lobsters.

Lobster, as a culinary delicacy, may be prepared in various ways. It may be cooked or broiled as a whole and served in the shell, or the meat may be removed to serve as an ingredient in a variety of dishes.

The chitinous exoskeleton of the lobster is extremely hard in its natural state. Upon cooking, it exhibits greater hardness and considerable resiliency which makes it difficult to handle. The dorsal shell which, in fact, is the fused segments of the body protects the vital organs underneath it and extends and overlaps the first two somites of the abdominal portion. The latter is generally referred to as the tail.

In the preparation of the lobster, whatever dish may ultimately be made, it is advantageous to remove the dorsal shell—either before or after cooking, but preferably before—in order to gain access to the vital organs for cleaning, particularly the gills must be removed and the liver taken out. The lobster, so cleaned, contains fully edible meat; whereas, if cooked without prior cleaning, the body portion will have an unappetizing greenish color due to the bile exuding from the liver.

Removal of the dorsal shell or cutting through it, however, is by no means easy. Using a knife, one must have considerable dexterity to accomplish the task. The risk of injury to the hand from the sharp edge of the flexible shell, or slippage of the knife itself, is particularly great.

Accordingly, it is the primary object of this invention to provide an implement particularly adapted to the removal of the dorsal shell of a lobster.

It is a particular feature of the invention that the utensil made in accordance therewith is extremely simple and easy to use.

The advantage of the invention is that the implement, so made, is safe, even when used by inexperienced hands, and protects the user from injury.

Other objects, features and advantages will be apparent from the following description of the invention, pointed out in particularity in the appended claims and taken in connection with the accompanying drawing, in which:

FIG. 1 is a side elevational, perspective view of the implement;

FIG. 1a is a partial, sectional view, taken along the line indicated by the arrow in FIG. 1;

FIG. 3 illustrates the first step in the application thereof; and

FIG. 4 is a perspective view showing the lifting of the shell by the user of the implement.

Figure 2:
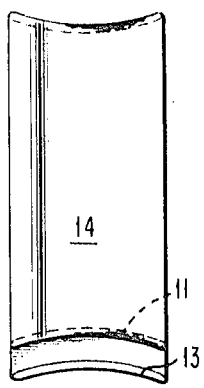
FIG. 2 is a front elevational view of the utensil.

Referring to the figures, it is seen that the implement consists essentially of a frame 10 of deltoidal shape, so dimensioned as to allow the passage of the fingers of the hand within its confines. This is illustrated in FIG. 3.

The frame 10 thus exhibits three sides of a triangular structure, of which the base 11 extends to and abuts the inner face of the short side 12. The latter has a bent-back portion 13 forming a hook which runs parallel with the bottom 11, defining a space therebetween which is so dimensioned as to accommodate the thickness of the shell of the lobster. The hypotenuse 14 of the triangle completes the structure.

The frame 10 may be made of various materials, preferably consisting of a stainless steel strip bent in the form shown. Of course it may also be molded from plastic material, such as acrylic resin, resulting in a strong and durable utensil.

It is to be noted that the base 11 and the hook portion 13, as well as the hyptotenuse 14, have a slight inward curvature transverse to their longitudinal axis. This has the advantage that the base 11 conforms to the curvature of the shell of the lobster and the curvature of the hypotenuse 14 allows a comfortable grip for the fingers of the hand.

The sectional view in FIG. 1a illustrates the curvature of the base 11 and that of the hook member 13. While the strip bent in the shape shown may possess satisfactory strength for the purpose intended, nonetheless it is contemplated that the juncture of the base 11 with that of the short side 12 may be reinforced in case of stainless steel by welding near the edges as shown at 15 and 16.

Use of the utensil is illustrated in FIG. 3. It is seen that when gripped by the hand, the fingers are placed within the confines of the frame with the thumb resting on the outer surface of the hypotenuse 14 near the corner of the triangle formed by the side 12 and the hypotenuse 14. The hook portion 13 is slid beneath the shell 18 of the lobster 19, shown herein a partial view for the sake of illustration. In applying the utensil, the hook portion 13 is placed at the dividing line between the shell 18 and the somite 20 of the lobster and is slid thereunder by a backward motion. Once it is so placed, the user may swing the utensil laterally in both directions so as to separate the tissue which at that point firmly attaches the shell 18 to the abdominal portion of the lobster. Thereafter, in the position as shown in FIG. 3, with the apex 21 serving as a fulcrum, the utensil is lifted in the direction shown by the arrow. In this manner, the shell 18 is lifted from the body of the lobster as seen in FIG. 4.

Lifting the shell of the lobster results in instant death of the animal and exposes the vital organs. Using one edge of the utensil, e.g., the edge 22 of the short side 12, the gills may be scraped clean. Organs, such as the liver, may then be removed by any suitable implement. After the cleaning operation, if desired, the shell 18 may be replaced on the lobster and the latter boiled or broiled as the case may be, and served as a whole to give an appetizing appearance.

The body portion will present a clean reddish appearance, devoid of the greenish color, since the liver has been removed. All of the meat under the shell is edible, the same as that in the claws and the tail.

The invention in its broader aspects is not limited to the specific embodiment herein shown and described but changes may be made within the scope of the accompanying claims without departing from the principles of the invention and without sacrificing its chief advantages.

What is claimed is:

1. A culinary implement for the removal of the dorsal shell of crustaceans, comprising a frame having sides defining a deltoidal structure, said frame allowing the insertion of the fingers for the manipulation of said implement, a bent-back member forming a hook with one of said sides and spaced therefrom for accommodating a portion of said shell whereby, upon use, said side resting on the dorsal shell functions as a lever for the lifting of said shell.

2. A culinary implement according to claim 1 wherein said side forms the base of a triangle, the hypotenuse of which is the handle for the manipulation of said implement.

3. A culinary implement for the removal of the dorsal shell of a lobster, consisting of a strip bent in the shape of a right angle, the hypotenuse of which forms the handle of the implement, and a hook member extending downwardly from the short side thereof being bent back in parallel with the bottom side.

4. A culinary implement in accordance with claim 3 wherein the strip portions forming the hypotenuse, the bottom side, and the hook member are curved inwardly transverse to their longitudinal axis.

5. A structure in accordance with claim 3 wherein said strip is made of stainless steel.

6. A structure in accordance with claim 3 wherein said strip is made of plastic material.

References Cited

UNITED STATES PATENTS 677,543    7/1901    Herrington _____ 17—66

FOREIGN PATENTS 189,130    4/1937    Switzerland _____ 30—291

LUCIE H. LAUDENSLAGER, Primary Examiner